(12) United States Patent
Christensen

(10) Patent No.: US 9,756,910 B2
(45) Date of Patent: Sep. 12, 2017

(54) SAND BASED JEWELRY

(71) Applicant: Holly Daniels Christensen, Dedham, MA (US)

(72) Inventor: Holly Daniels Christensen, Dedham, MA (US)

(73) Assignee: Dune Jewelry, LLC, Boston, MA (US)

( * ) Notice: Subject to any disclaimer, the term of this patent is extended or adjusted under 35 U.S.C. 154(b) by 0 days.

(21) Appl. No.: 15/420,190

(22) Filed: Jan. 31, 2017

(65) Prior Publication Data

US 2017/0135451 A1    May 18, 2017

Related U.S. Application Data

(63) Continuation-in-part of application No. 14/680,572, filed on Apr. 7, 2015, now Pat. No. 9,591,901, which is a continuation-in-part of application No. 13/245,685, filed on Sep. 26, 2011, now Pat. No. 9,009,974.

(51) Int. Cl.

| A44C 27/00 | (2006.01) |
| B29C 39/00 | (2006.01) |
| B29C 35/08 | (2006.01) |
| B29K 103/08 | (2006.01) |
| B29L 31/00 | (2006.01) |

(52) U.S. Cl.
CPC .......... *A44C 27/007* (2013.01); *B29C 39/003* (2013.01); *B29C 35/0805* (2013.01); *B29C 2035/0827* (2013.01); *B29K 2103/08* (2013.01); *B29L 2031/743* (2013.01)

(58) Field of Classification Search
CPC ......... C04B 26/14; C04B 26/23; C04B 14/06; C04B 14/28; C04B 14/068; C04B 14/22; C04B 14/24; C04B 40/0222; A44C 27/001; A44C 27/005; A44C 27/007; A44C 15/005; A44C 15/0055; A44C 25/001; A44C 25/00; Y10T 29/49597; Y10T 29/49588; Y10T 29/4959
USPC ......... 29/896.43, 896.4, 896.41; 6/3, 12, 33; 264/256

See application file for complete search history.

(56) References Cited

U.S. PATENT DOCUMENTS

| 2,943,953 | A | | 7/1960 | Daniel |
| 3,477,990 | A | | 11/1969 | Dante et al. |
| 4,810,539 | A | * | 3/1989 | Todd ............ A44C 21/00 40/27.5 |
| 5,747,168 | A | * | 5/1998 | Mack ........... A44C 27/00 427/385.5 |
| 6,242,505 | B1 | * | 6/2001 | Gassner ........ B44C 1/20 522/18 |
| 6,354,107 | B1 | * | 3/2002 | Verducci, Sr. ...... A44C 27/00 428/38 |
| 6,607,818 | B1 | | 8/2003 | Satz et al. |
| 2006/0166002 | A1 | | 7/2006 | Grey et al. |
| 2007/0104928 | A1 | | 5/2007 | Yokochi et al. |
| 2010/0166997 | A1 | | 7/2010 | Ghisaka et al. |

(Continued)

*Primary Examiner* — Jason L Vaughan
(74) *Attorney, Agent, or Firm* — Lambert & Associates; Gary E. Lambert; David J. Connaughton, Jr.

(57) ABSTRACT

A sand based jewelry and methods of making sand based jewelry is provided. The jewelry having a quantity of sand mixed with a quantity of binding medium. The binding medium and sand mixture are capable of being solidified and mounted to a jewelry setting. The jewelry setting attached to a jewelry item.

18 Claims, 3 Drawing Sheets

(56) References Cited

U.S. PATENT DOCUMENTS

2010/0300149 A1 12/2010 Seliktar
2010/0307671 A1 12/2010 David

* cited by examiner

SAND BASED JEWELRY

BACKGROUND OF THE INVENTION

Field of the Invention

The present invention relates generally to jewelry. More particularly, the present invention relates to jewelry comprising sand particles immobilized in a cured binding medium.

Description of Related Art

Sand frequently has sentimental value because it is often found at beach destinations or other locations having sentimental value. People often save sand from memorable places as a way to remember and commemorate special experiences.

Often, saved sand may be incorporated into decorative home items such as jars, candles, picture frames, and the like. However, these items suffer from the shortcoming of being large, heavy, and non-portable. Indeed, such items are designed for home or office decoration because of the density of sand and the amount of sand generally required to be noticeable.

Therefore, what is needed is a way to display memorable sand having sentimental value in a portable and decorative fashion.

SUMMARY OF THE INVENTION

The subject matter of this application may involve, in some cases, interrelated products, alternative solutions to a particular problem, and/or a plurality of different uses of a single system or article.

In one aspect, a sand based jewelry is provided. The sand based jewelry comprises a quantity of sand, and a quantity of liquid binding medium capable of being solidified when cured. The sand and binding medium are mixed when the binding medium is in a liquid state, forming a mixture. A jewelry setting is provided capable of receiving the mixture of the sand and binding medium, the jewelry setting may be attached to a jewelry item.

In another aspect, a method of forming sand-based jewelry is provided. The method comprises the steps of selecting a quantity of sand; selecting a quantity of liquid binding medium capable of being solidified to a solid state; mixing the quantity of sand and the quantity of binding medium forming a mixture; curing the mixture to solidify the binding medium; and mounting the mixture into a jewelry setting.

In yet another aspect, a method of forming sand-based jewelry is provided. The method comprises the steps of selecting a quantity of sand; processing the quantity of sand; selecting a quantity of liquid binding medium capable of being solidified to a solid state; mixing the quantity of sand and the quantity of binding medium forming a mixture; curing the mixture to solidify the binding medium; sanding the cured mixture; filling in any divots of the cured mixture; polishing the cured mixture; mounting the mixture into a jewelry setting, before or after curing; and attaching the jewelry setting to a jewelry item.

DETAILED DESCRIPTION

Figure 1:
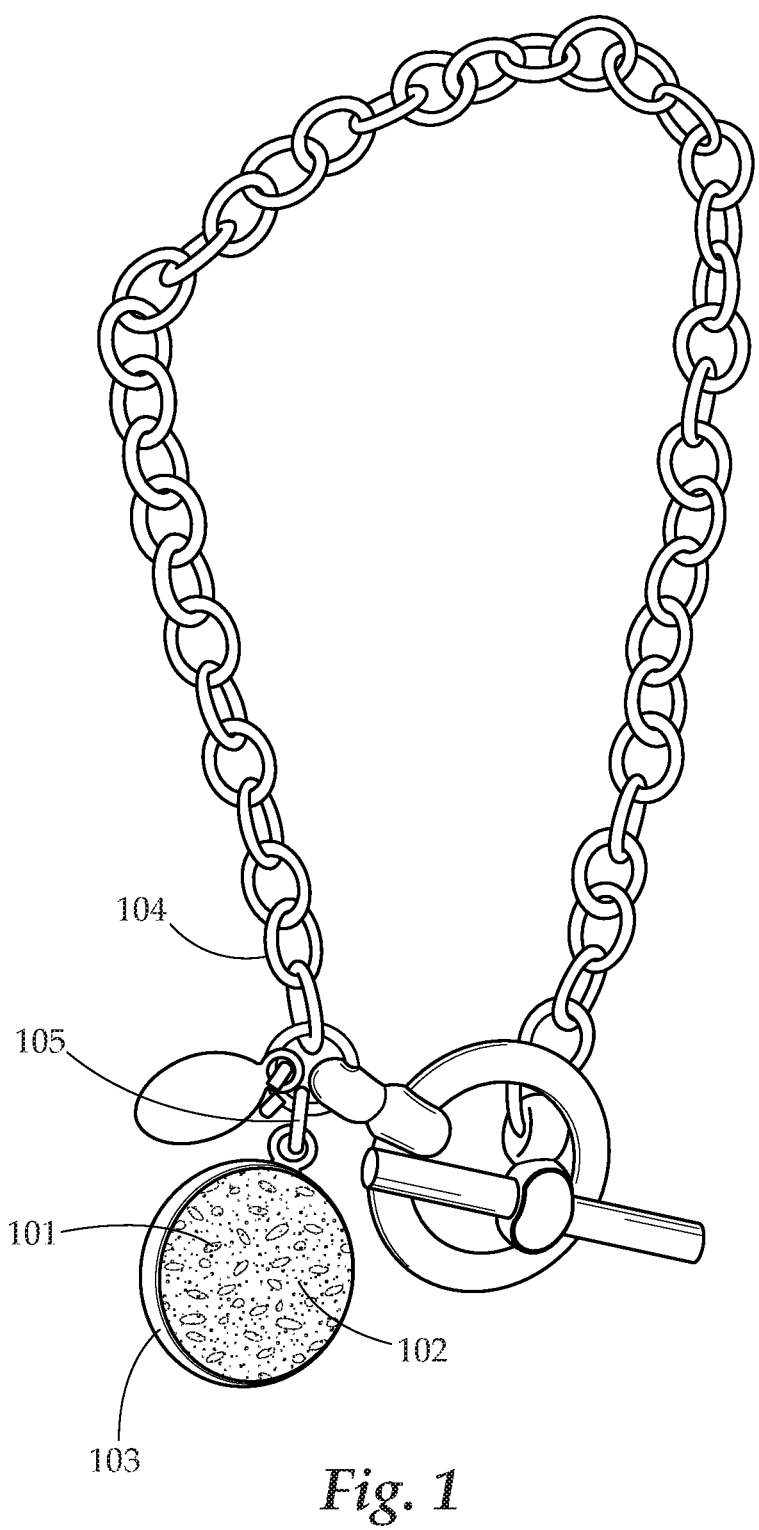
FIG. 1 provides an embodiment of sand based jewelry is provided.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns sand based jewelry and methods of making sand based jewelry. The jewelry may comprise a quantity of sand particles mixed into a binding medium. This sand and binding medium mixture may be secured in a jewelry setting and the setting may be incorporated into a jewelry item.

The sand based jewelry of the present invention may utilize a quantity of sand as the central decorative element. The sand may be of any particle size and composition that may allow the sand to be distributed throughout a binding medium.

Typically, the sand may be comprised of mostly silica, however, the content of the sand may vary greatly depending on the original sand location.

The term sand is defined herein to refer to fairly fine granular particles that are found predominantly in nature. Typical sources for the sand contemplated herein may include beaches, lakes, rivers, ponds, baseball stadiums, golf courses, and the like.

The sand may be comprised of any variety of different minerals. In one embodiment, the sand is comprised of mostly silica. In varying embodiments, the sand may comprise different amounts of coral, crushed shell, limestone, gypsum, feldspar, clay, and a plurality of other minerals that may provide a unique sand coloration, particle size, texture and appearance. The present invention may further use any granular material for the jewelry creation. Granular material may include organic and inorganic matter, such as naturally occurring materials which may be ground, cut, pulverized or otherwise separated into granular material or powder. For example, materials such as leaves, sand, bark, soil, ashes, hair, combinations of materials, and the like may also be particulate matter used in the present invention. Generally, any granular material that is a conglomeration of discrete solid, macroscopic particles may be used as the "sand" or "granular material" of the present invention. While the present invention is discussed herein generally referring to "sand," it should be understood that any granular material may be substituted without straying from the scope of this invention.

The sand may be of any particle size that may be mixed into a binding medium and incorporated into a jewelry item. In the event that a quantity of sand has particles too large for a particular jewelry application, the sand particles may be ground down to a more appropriate size. Grinding device may be used to grind the sand, including a mortar and pestle, or a mechanized grinding device.

In one embodiment, the sand may be washed using various washing methods to remove impurities such as salt, chemicals, or organic material. The washing may be performed with a fluid such as water, and may be a batch or continuous process.

The sand may be mixed into a binding medium, which may then be solidified, forming a cured mixture which may immobilize the sand within the cured binding medium. The binding medium may be any liquid that sand may be mixed into and that may be later solidified under standard atmospheric conditions. The solid mass thus formed may serve as an ornament for jewelry.

Typically the binding medium may be an epoxy curable by heat, atmospheric conditions, or ultraviolet (UV) radiation, however, other curable substances may work equally well. Specific examples of biding mediums may include Devcon® Epoxy Resin, Devcon® 5 minute fast drying epoxy, Lisa Pavelka's Magic Glos®, UV curable resin, and colorless epoxy resin. Other binding mediums may include enamel, as well as kiln fired enamel, precious metal clay, and the like. In some embodiments, the binding medium and sand mixture may be exposed to high heat such as an open flame after it has cured. This high heat may liquefy or partially liquefy a top layer of the cured mixture, allowing it to settle, filling any holes or divots, and making a smoother, even top layer once the heat is removed.

In one embodiment, the binding medium may be viscous enough to prevent the sand from rapidly sinking to the bottom of the vessel having the binding medium and sand. In this embodiment, the viscous binding medium may allow the sand to be distributed through it in a unique and stylized manner, or evenly, depending on the desired appearance of the structure.

In another embodiment, the binding medium may be selected to form a solid mass that may be polished. Typically this will require the solid mass to have a high hardness to withstand the polishing and provide a polished finish.

In yet another embodiment, the binding medium may be substantially transparent when cured. In another embodiment, the binding medium may be substantially translucent when cured. In still another embodiment, a colorant may be added to the binding medium to color it once cured.

The quantity of sand mixed into the binding medium may vary depending on the desired appearance of the solidified cured mixture. In one embodiment, a 50/50 mixture of sand and binding medium by volume may be used. It should be understood that different composition ratios may be used depending on the desired final appearance.

The sand based jewelry may further comprise a jewelry setting to receive, or be attached to, the sand-binding medium mixture. In one embodiment, the jewelry setting may receive the mixture before curing, when in a liquid state. In another embodiment, the jewelry setting may receive the mixture after curing, when in a solid state. In this embodiment, the solid mixture may be cut and shaped before being received by the jewelry setting. The jewelry setting may be made of any material that may be decorative, capable of mounting to a jewelry item, and capable, both physically and chemically, of receiving the sand and binding medium mixture. Materials of which the jewelry setting may be made include, but are not limited to plastics, metal coated plastics, metals and preferably precious metals such as silver, gold, platinum, and the like.

The jewelry setting may be any setting known in the art. In embodiments wherein the sand-binding medium mixture is cured before mounting in the jewelry setting, the solid mass may be mounted to the jewelry setting as would be a typical jewelry stone.

In embodiments wherein the sand-binding medium mixture is cured after being set in the jewelry setting, the binding medium may be placed in the jewelry setting, its proper appearance being ensured, and then cured. In this embodiment, the binding medium may additionally serve to act as an adhesive to the jewelry setting.

Jewelry settings may be any structures known in the art to set jewelry, as well as custom designed settings to receive the binding medium before it is cured. By way of non-limiting example, jewelry settings may include bezel settings, prong settings, channel settings, bead settings, burnish settings, and pave settings, among others.

The jewelry setting may be attached to a jewelry item. The attachment of the two may thus form the complete sand based jewelry. The jewelry item may be any item that allows attachment of the jewelry to a wearer, to the wearer's clothing, or to the wearer's accessories. Types of jewelry items contemplated herein may include earrings and other stems for body piercings, necklace chains, bracelets and bracelet chains, clasps, cuff links, rings, buttons, brooches, and belt buckles, among other things.

It should be understood that the present invention is not intended to be limited solely to jewelry. The jewelry item that the jewelry setting may be attached to is defined broadly and may refer to related accessories such as key chains, watches, hair accessories and the like, in addition to traditional jewelry items.

In varying embodiments, the sand-based jewelry may have the immobilized sand portion flush with the jewelry setting, protruding out of the jewelry setting, or inset somewhat into the jewelry setting.

In an embodiment having the immobilized sand and binding medium mixture inset into the jewelry setting, the mixture may form a concave shape, being flush or nearly flush with the jewelry setting at a perimeter, and being below the top of the jewelry setting at the center. As such, this inset embodiment forms a shape that extends into a void defined by the jewelry setting. Preferably this concave shape is in a smooth and even contour. When being produced, a quantity of binding medium and sand is placed in the jewelry setting, the quantity being small enough to not fill the setting completely, such that the volume of the mixture is less than a volume defined by the jewelry setting. An adhesion between the binding medium and the edges of the setting causes the binding medium mixture to be higher and closer to the top of the jewelry setting edges. At a center, away from any edges, the binding medium mixture will settle to be lower than the top of the jewelry setting edges. A thin layer of the binding medium without sand mixed in may be spread over a top of the cured (or uncured) binding medium and sand mixture. Once cured, the binding medium and/or binding medium mixture may be exposed to heat such as an open flame, which may melt a portion of the cured binding medium. Once cooled, the binding medium will fill in any divots or holes, leaving a very smooth finish.

A method of creating sand-based jewelry is provided. The method may comprise the steps of selecting sand, selecting a binding medium, mixing the sand and binding medium, curing the mixture, mounting the mixture to a jewelry setting, and attaching the jewelry setting to a jewelry item.

In one embodiment, the step of selecting sand may be performed by a jewelry maker. In another embodiment, the step of selecting sand may be performed by a purchaser of the jewelry. The sand selected may generally be of any composition and particle size that may be mixed into a binding medium and incorporated into a jewelry item. In the event that the sand particle size is exceptionally large, the step of selecting the sand may further include the step of processing the sand to reduce its particle size.

In one embodiment, the step of processing the sand may involve crushing the sand particles with a mortar and pestle.

The method of creating sand-based jewelry may further comprise the step of washing the sand. This step may be particularly useful in embodiments where the sand is selected from a beach because sand from a beach may have a high salt content because of its proximity to salt water. The step of washing the sand may involve any process to remove salt from the sand. In one embodiment, a fluid may be mixed with the sand to dissolve the salt or other impurities. In a further embodiment, water may be mixed with the sand to dissolve the impurities. After mixing, the fluid may be poured off and the sand allowed to dry.

The step of selecting the medium may consider factors including the type of sand used, desired appearance and shape of the final cured mixture, and the type of jewelry to be created. In one embodiment the step of selecting the binding medium may take into account the color and consistency of the sand selected to best match the sand and the "feel" sought for the jewelry. In another embodiment, the step of selecting the binding medium may be based on the intended design of the jewelry. For example, in a jewelry design wherein the sand and binding medium mixture is inset into the jewelry and flush with the surface of the jewelry setting, an epoxy bonding medium may be selected. In another example, in a jewelry design where the sand and binding mixture is intended to protrude above the surface of the jewelry, a UV cured resin may be selected.

The step of mixing the sand and binding medium may be performed in any manner to effectively distribute the sand throughout the binding medium. In one embodiment, the step of mixing may be done on a large scale in large mixing vessels or mixing machines. In another embodiment, the mixing may be performed on a small scale by mixing just enough sand and binding medium to form the necessary sand-binding medium mixture for an individual jewelry setting. It should be understood that various amounts of sand and binding medium may be mixed without straying from the scope of the invention.

The step of mixing the sand may employ varying ratios of sand and binding medium. In one embodiment, the ratio may be 50/50 by volume of sand to binding medium.

The step of curing the mixture may be performed in any fashion that may allow the particular binding medium to cure. For example, an epoxy binding medium may be allowed to cure under standard atmospheric conditions, or under the application of heat or a vacuum. In one embodiment, the curing process may be performed in approximately 10 hours. In another embodiment where a UV cured resin is selected, curing may be performed by exposing the mixture to a UV radiation source. The UV radiation source may include, among others, black lights, or specialized UV lamps.

In one embodiment, the sand and binding medium mixture may be added to a jewelry setting when in a liquid form, and then cured. In another embodiment, the mixture may be cured, and then mounted to the jewelry setting. In embodiments where the curing is performed before mounting to the jewelry setting, the method may include the further step of cutting the cured sand mixture to a desired shape to compliment the jewelry setting.

After curing, the method may include the step of polishing the sand and binding medium mixture. This step may comprise any process that may effectively polish the cured mixture. In one embodiment, the polishing is a three step sanding process using progressively finer sanding materials.

In another embodiment, the additional step of sanding the cured mixture may be included in the polishing step. The step of sanding may remove any larger imperfections and allow for more complete polishing. In one embodiment, the step of sanding the cured mixture may be a three step process using 30 grit sand paper, 25 grit sand paper, and 9 grit sand paper, to progressively smooth the cured mixture.

In a particular embodiment, the step of sanding may comprise the steps of wet lapidary sanding, and hand sanding. These steps may occur before the step of polishing the cured mixture. This embodiment may be particularly useful when the cured sand and binding medium mixture is set in a bezel setting and flush with a top of the setting.

In still another embodiment, the additional step of filling any holes or divots may be included in the sanding step. Divots may be formed, for example, by removal of one or a plurality of sand particles in the sanding or curing process. In one embodiment, the step of filling any holes or divots may be performed by adding a layer of un-mixed binding medium to the divots, and curing the binding medium.

The step of mounting the mixture to a jewelry setting may be performed in any manner that effectively mounts the cured or un-cured mixture to a jewelry setting. In one embodiment, the un-cured, liquid mixture is poured or otherwise inserted into a bezel setting. In a further embodiment, a first layer of mixture is poured into a jewelry setting, cured, and then a second layer is poured over the first layer and cured. In another embodiment, the mixture is cured, cut and then mounted to a jewelry setting.

The step of attaching the jewelry setting to a jewelry item may be performed in any manner that may secure the jewelry setting to the desired jewelry item intended to be formed. In one embodiment, a link may join the jewelry setting to a necklace, bracelet or earring. In another embodiment, the jewelry setting may be fused to the jewelry item, for example if the jewelry item is a ring or cufflink.

In embodiments where the sand selected contains impurities, the method may include the further step of washing the sand to remove the impurities. In one embodiment, the step of washing may be performed in a batch process by soaking the sand in a fluid such as water, and pouring off the fluid once, or a number of times. In another embodiment, the sand may be washed in a continuous process.

Turning now to FIG. 1 an embodiment of sand based jewelry is provided. In this embodiment, the jewelry is shown as a bracelet. A quantity of sand 101 is immobilized in a cured binding medium 102. The sand 101 and binding medium 102 are set in a jewelry setting 103, shown here as a circular bezel setting. The jewelry setting 103 is in turn attached to a jewelry item 104 by a link 105.

Figure 2:
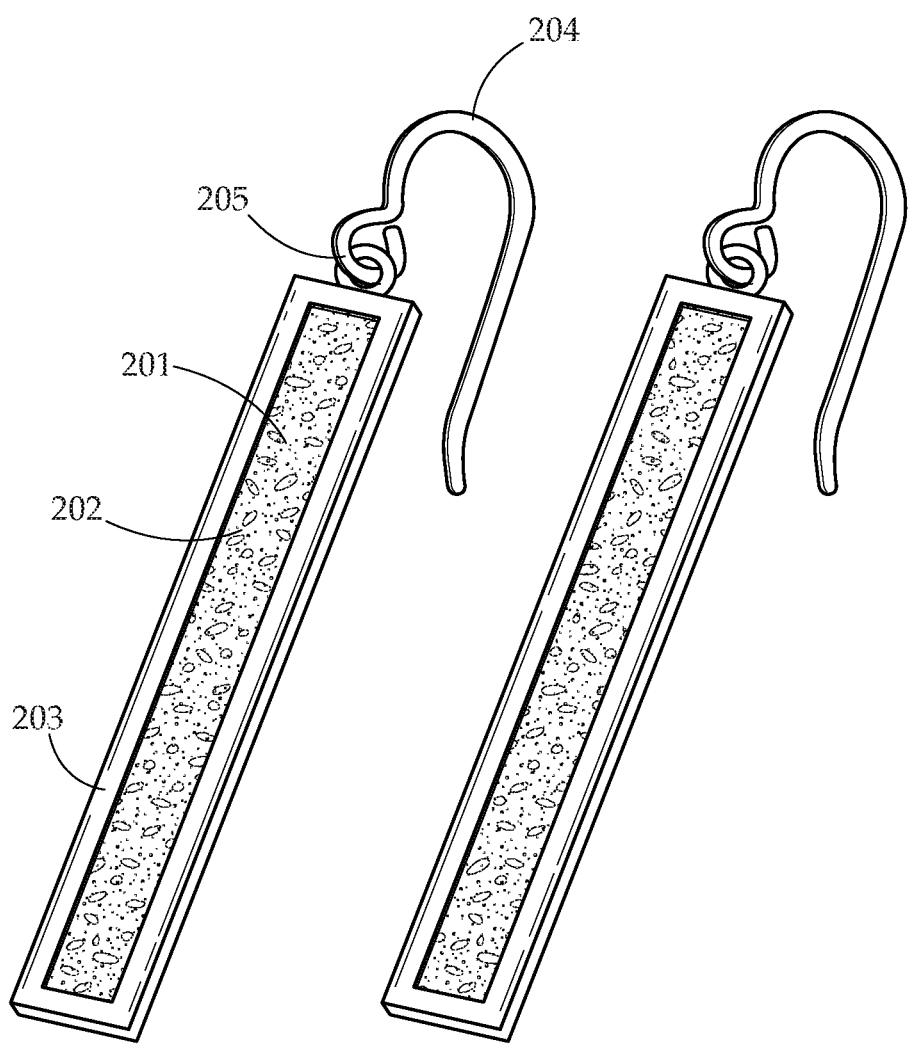
FIG. 2 provides another embodiment of sand based jewelry. In this embodiment, the jewelry is shown as earrings.

FIG. 2 shows another embodiment of sand based jewelry. In this embodiment, the jewelry is shown as earrings. A quantity of sand 201 is immobilized in a cured binding medium 202. The sand 201 and binding medium 202 are set in a jewelry setting 203, shown here as a rectangular bezel setting. The jewelry setting 203 is in turn attached to a jewelry item 204 by a ring 205 formed by the jewelry item 204.

Figure 3:
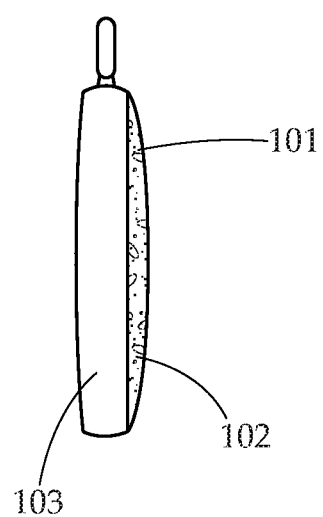
FIG. 3 provides a detail view of a jewelry setting of the sand based jewelry.

FIG. 3 provides a detail view of a jewelry setting of the sand based jewelry. A quantity of sand 101 is immobilized in a cured binding medium 102. The sand 101 and binding medium 102 are set in a jewelry setting 103. In this embodiment, the sand 101 and binding medium 102 mixture extends out of the jewelry setting 103 to form a "bubble."

Figure 4:
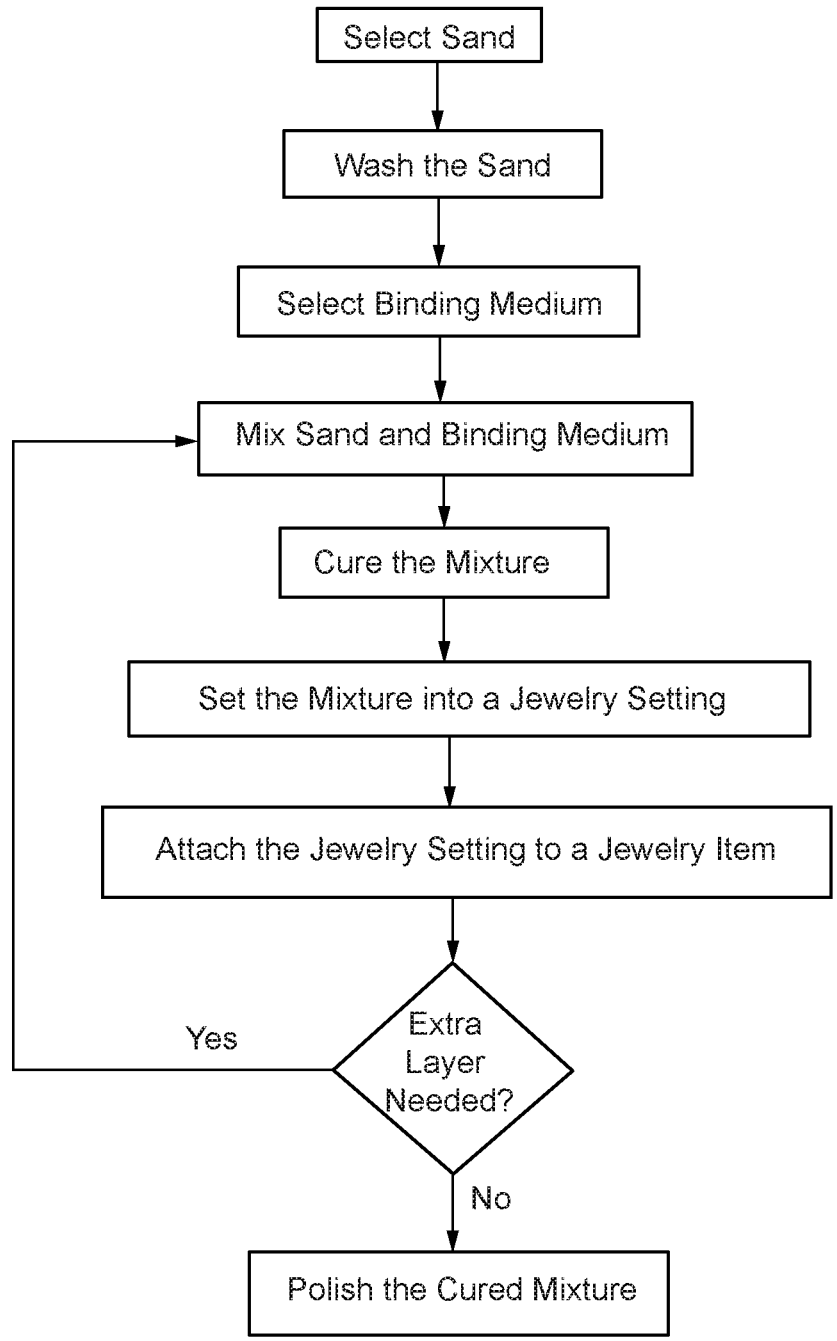
FIG. 4 provides a figure showing an embodiment of a method of making sand based jewelry.

FIG. 4 provides a figure showing an embodiment of a method of making sand based jewelry. The initial step involves selecting sand. This step may involve selecting an appropriate quantity of sand for the jewelry, and additionally may involve selecting an appropriate type of sand for the jewelry. Next the selected sand is washed. The step of washing the sand may serve to remove soluble impurities in the sand. Next a binding medium may be selected. The sand and binding medium are mixed, and cured. The mixture, either before or after curing is set into a jewelry setting. This jewelry setting is attached to a jewelry item such as a bracelet, earring or the like. Finally, in the event that the jewelry requires multiple layers of the sand and binding medium mixture, the steps may be repeated until the jewelry achieves its desired structure. Finally the cured mixture is polished.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A method of forming granular material based jewelry comprising the steps of:
   selecting a quantity of granular material;
   selecting a quantity of binding medium capable of being cured to a solid state, the step of selecting comprising:
      selecting the binding medium to be translucent or transparent when cured;
   mixing the quantity of granular material and the quantity of binding medium forming a mixture;
   mounting the mixture to a jewelry setting;
   curing the mixture to solidify the binding medium; and
   adding a second layer of the mixture after the curing step.

2. The method of forming granular material based jewelry of claim 1 wherein the granular material is sand.

3. The method of forming granular material based jewelry of claim 1 further comprising the step of attaching the jewelry setting to a jewelry item.

4. The method of forming granular material based jewelry of claim 1 further comprising the step of polishing the cured mixture.

5. The method of forming granular material based jewelry of claim 1 further comprising the step of grinding the granular material.

6. The method of forming granular material based jewelry of claim 1 further comprising the step of washing the granular material.

7. The method of forming granular material based jewelry of claim 1 wherein the step of curing the mixture comprises exposing the mixture to a quantity of ultra violet radiation.

8. A method of forming granular material based jewelry comprising the steps of: selecting a quantity of granular material; selecting a quantity of binding medium capable of being cured to a solid state; mixing the quantity of granular material and the quantity of binding medium forming a mixture; curing the mixture to solidify the binding medium thereby immobilizing the quantity of granular material; mounting the mixture to a jewelry setting; sanding the cured mixture; and adding a second layer of the mixture to the cured mixture.

9. The method of forming granular material based jewelry of claim 8 wherein the granular material is sand.

10. The method of forming granular material based jewelry of claim 8 further comprising the step of cutting the cured mixture.

11. The method of forming granular material based jewelry of claim 8 wherein the step of selecting a quantity of binding medium is determined by the desired appearance and shape of the cured mixture.

12. The method of forming granular material based jewelry of claim 8 further comprising the step of polishing the cured mixture.

13. The method of forming granular material based jewelry of claim 8 further comprising the step of washing the granular material.

14. The method of forming granular material based jewelry of claim 8 wherein the step of curing the mixture comprises exposing the mixture to a quantity of ultra violet radiation.

15. The method of forming granular material based jewelry of claim 8 further comprising the step of heating the cured mixture after the curing step.

16. A method of forming granular material based jewelry comprising the steps of: selecting a quantity of granular material; selecting a quantity of binding medium capable of being cured to a solid state, the step of selecting comprising: selecting the binding medium to be translucent or transparent when cured; mixing the quantity of granular material and the quantity of binding medium forming a mixture; curing the mixture to solidify the binding medium; mounting the mixture to a jewelry setting; adding a second layer of the mixture to the cured mixture; and polishing the mixture.

17. The method of forming granular material based jewelry of claim 16 wherein the granular material is sand.

18. The method of forming granular material based jewelry of claim 17 wherein the step of mounting the mixture to a jewelry setting comprises mounting the mixture to a bezel jewelry setting.

\* \* \* \* \*